Feb. 14, 1928.

H. J. YEAGER

ELECTROLYTIC APPARATUS

Filed Jan. 16, 1925

1,658,872

INVENTOR
Henry J. Yeager
BY
Nathaniel L. Leek
HIS ATTORNEY

Patented Feb. 14, 1928.

1,658,872

UNITED STATES PATENT OFFICE.

HENRY J. YEAGER, OF LANCASTER, PENNSYLVANIA.

ELECTROLYTIC APPARATUS.

Application filed January 16, 1925. Serial No. 2,727.

This invention relates to electrolytic apparatus and more particularly to apparatus for use in the electrolytic deposition of metals.

In depositing metals electrolytically it is important to maintain the liquid in a constantly agitated state to ensure equal deposition from all portions of the electrolyte. This has heretofore been accomplished by mechanical means which frequently introduces impurities into the electrolyte unless extreme care is taken.

An object of this invention is to ensure constant agitation of the electrolyte in an electrolytic cell during deposition. A further object is to provide a means of agitation external to the cell and mechanically independent therefrom.

These and other objects which will be apparent as the nature of the invention is disclosed are accomplished by causing a magnetic field to traverse the electrolyte at right angles to the direction of the flow of current between the electrodes which acts upon particles of the electrolyte carrying current to exert a force at right angles to both the magnetic lines and the current, causing displacement of the liquid. The apparatus is so constructed that this displacement causes rotation of the electrolyte within the cell.

The novel features which are believed to be characteristic of this invention will be pointed out with particularity in the claims appended hereto. The invention itself, however, as to its objects and advantages, the mode of its organization and the manner of its operation will be better understood by referring to the following description taken in connection with the accompanying drawings forming a part thereof, in which:

Figure 1:
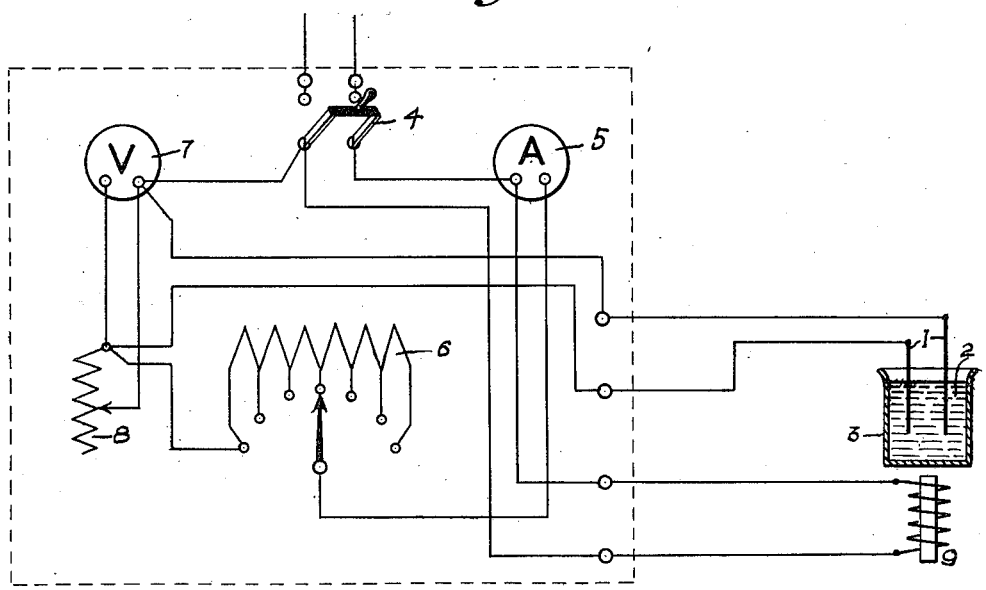
Fig. 1 is a diagrammatic representation of one form of this invention.

In the system shown in Fig. 1 electrodes 1 are inserted in electrolyte 2 contained in beaker or ether vessel 3. Current is supplied to electrodes 1 from a 110 volt direct current source not shown through double pole switch 4, ammeter 5 and variable resistance 6. Voltmeter 7 is connected across the electrodes 1 and serves to indicate the voltage applied thereto. Variable resistance 8 is connected in shunt to the voltmeter 7 and to electrodes 1.

The voltage across the electrodes 1 may be varied by adjusting resistance 6. The current flowing through the cell at a given voltage may be regulated by adjusting shunt resistance 8. Electromagnet 9, connected directly across the 110 volt current supply, is placed beneath the beaker or vessel 3 so that its magnetic field enters the beaker, the electromagnetic lines of force being at an angle to the flow of current in the cell. The magnetic field will thus exert a force on the current-carrying electrolyte causing displacement and consequent rotation of the liquid.

Figure 2:
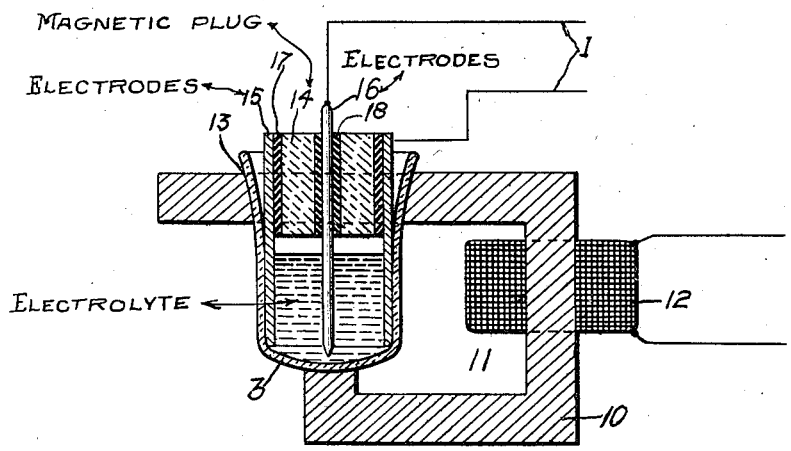
Fig. 2 is a sectional view of a modification of the electromagnetic structure in Fig. 1.

In the modification shown in Fig. 2 magnetic core 10 of electromagnet 11, energized by coil 12, is positioned with a portion below and supporting beaker 3 and a portion encircling the upper portion thereof to form a support. The latter portion contains an aperture as shown at 13 in which the beaker 3 is inserted and supported. To complete the magnetic circuit and reduce the gap through which the magnetic lines of force must pass a plug 14 of magnetic material is inserted in the top of the beaker. Plug 14 not only completes the magnetic circuit but serves as a support for electrodes 15 and 16. Electrode 15 is tubular in shape and surrounds the liquid in the beaker. It may be insulated from plug 14 by rubber or other insulating means 17, the friction of which will support the electrodes. Electrode 16, also insulated from the plug by a rubber tube or other equivalent means of insulation 18, is inserted in the center of the plug and extends into the electrolyte. These electrodes are readily removable for cleaning or replacement as the friction of the insulattion is sufficient to secure them in place.

In the system shown in this figure the magnetic lines of force will extend vertically from the portion of the magnetic core below the beaker to the plug and thence to the top portion of the core. By this method the gap through which the lines must pass is decreased and the magnetomotive force needed to drive the lines through the circuit is decreased. The current flows from the center electrode to the outer circular electrode, or vice versa, radially, being at right angles to the magnetic lines of force. This will cause a force to be exerted at right angles to the two and cause rotation of the electrolyte within the beaker.

The system shown and described is equally applicable to apparatus for the electrolytic determination of metals, for electroplating, for purification of metals or to electrolysis in general.

Although the invention has been described in a specific form by way of illustration it is not to be limited thereto but only in accordance with the spirit of the invention as defined by the following claims.

What is claimed is—

1. An electrolytic cell comprising a container, electrodes and an electrolyte therein, an electromagnet having a core extending below said container, a magnetic plug adapted to be inserted in said container and form a part of the magnetic path, a cylindrical electrode surrounding said plug and a vertical rodlike electrode in the center portion thereof and concentric therewith whereby the current flows radially in said cell and the magnetic field extends vertically cutting said current flow at an angle to exert a force on said electrolyte and produce motion thereof.

2. An electrolytic cell comprising a container, an electromagnet having a substantially U-shaped core, said core being adapted to support the top and bottom of said container, a magnetic plug adapted to be inserted in said container, a cylindrical electrode surrounding said plug and a rodlike electrode supported in the center of said plug and electrically insulated therefrom, means whereby an electric current is caused to flow between said electrodes, and a magnetizing force for said electromagnet whereby a magnetic field is produced in said container at an angle to the direction of said current flow.

3. An electrolytic cell comprising a container, an electrolyte therein and an electromagnet having a pair of pole pieces, said pole pieces being adapted to support the top and bottom respectively of said container, a magnetic plug adapted to be inserted in the top of said container, a cylindrical electrode surrounding and insulated from said plug, an elongated electrode supported in the central portion of said plug and concentric with said cylindrical electrode, said electrodes being adapted to make contact with said electrolyte, means for causing current to flow between said electrodes, and means for producing a magnetic field between the pole pieces of said electromagnet.

4. An electrolytic cell comprising a container, electrodes and an electrolyte therein, an electromagnet having a substantially U-shaped core including two pole pieces, said pole pieces being adapted to support the top and bottom, respectively, of said container, a magnetic plug adapted to be inserted in the top of said container and to form a portion of one of said pole pieces, one of said electrodes comprising a cylindrical member supported by and insulated from said magnetic plug, the other electrode comprising a rodlike member supported by said plug, means for producing current flow between said electrodes, and means for producing a magnetic field between said pole pieces whereby a force is exerted on said electrolyte and motion thereof is produced.

In witness whereof I hereto subscribe my name this eighth day of January, A. D. 1925.

HENRY J. YEAGER.